US012802483B2

(12) United States Patent
El-ayoubi et al.

(10) Patent No.: US 12,802,483 B2
(45) Date of Patent: Nov. 17, 2026

(54) AUTONOMOUS DRAWING VERIFICATION AND REVISION SYSTEM

(71) Applicant: SAUDI ARABIAN OIL COMPANY, Dhahran (SA)

(72) Inventors: Ensan Mahmoud El-ayoubi, Abqaiq (SA); Ramsey James White, Abqaiq (SA); Nourah Alfarabi Ali, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 357 days.

(21) Appl. No.: 18/344,688

(22) Filed: Jun. 29, 2023

(65) Prior Publication Data

US 2025/0005954 A1 Jan. 2, 2025

(51) Int. Cl.
*G06V 30/422* (2022.01)
*G06Q 10/0631* (2023.01)
(Continued)

(52) U.S. Cl.
CPC ....... *G06V 30/422* (2022.01); *G06Q 10/0631* (2013.01); *G06T 11/26* (2026.01); (Continued)

(58) Field of Classification Search
CPC .... G06V 30/422; G06V 20/17; G06V 10/761; G06V 10/82; G06Q 10/0631; G06T 11/206
See application file for complete search history.

(56) References Cited

U.S. PATENT DOCUMENTS

| | | | |
|---|---|---|---|
| 8,578,262 | B2 | 11/2013 | Averitt et al. |
| 2008/0316206 | A1 | 12/2008 | Jaynes et al. |

(Continued)

FOREIGN PATENT DOCUMENTS

| | | | | |
|---|---|---|---|---|
| CN | 115294462 A | * 11/2022 | ............. G06V 20/13 |
| IN | 202011054553 A | 1/2021 | |

OTHER PUBLICATIONS

So-Won Choi et al.; "The Engineering Machine-Learning Automation Platform (EMAP): A Big-Data-Driven AI Tool for Contractors' Sustainable Management Solutions for Plants Projects", sustainability; vol. 13; No. 10384; pp. 1-33 (33 pages).

*Primary Examiner* — David F Dunphy
(74) *Attorney, Agent, or Firm* — Osha Bergman Watanabe & Burton LLP

(57) ABSTRACT

A method for automatically and autonomously comparing and updating the equipment and structure of a facility and one or more drawings representing the facility. The method includes obtaining a drawing from a drawing management system representing, at least, a portion of a facility and dispatching an autonomous vehicle (AV) to a location of the facility corresponding to the drawing. The method further includes collecting one or more visual images of the facility using the AV once it has reached the location and identifying discrepancies between the facility and the drawing using the one or more visual images and the drawing. The method further includes generating an updated drawing that corrects the identified discrepancies and accurately represents the facility and replacing the drawing with the updated drawing in the drawing management system upon review and approval by a user.

20 Claims, 9 Drawing Sheets

(51) Int. Cl.
*G06T 11/20* (2026.01)
*G06T 11/26* (2026.01)
*G06V 10/74* (2022.01)
*G06V 10/82* (2022.01)
*G06V 20/17* (2022.01)

(52) U.S. Cl.
CPC ............ *G06V 10/761* (2022.01); *G06V 10/82* (2022.01); *G06V 20/17* (2022.01)

(56) References Cited

U.S. PATENT DOCUMENTS

2022/0101507 A1* 3/2022 Tournier .............. G06Q 50/163
2023/0098595 A1* 3/2023 Carrington .............. G06F 30/15
703/2

* cited by examiner

AUTONOMOUS DRAWING VERIFICATION AND REVISION SYSTEM

BACKGROUND

Processing plants and industrial facilities such as refineries, power plants, and manufacturing facilities continuously undergo modifications to equipment. These modifications may be the result of maintenance and repair operations, equipment upgrades, and/or other activities. These modifications are typically executed through a management of change (MOC) process that involves updating engineering drawings on file (e.g., process & instrumentation diagrams (P&IDs)) to represent the facility. However, in many instances, although facilities may have an established MOC process, engineering drawings do not reflect actual field installations.

Generally, it is important to ensure that engineering drawings accurately represent a facility as the usage of incorrect or out-of-date engineering drawings may carry financial implications and safety implications. For example, operational decisions based on inaccurate engineering drawings may result in serious injury to an operator of the wrongly depicted facility. Typically, to ensure that engineering drawings accurately represent a facility, a physical audit or field survey is conducted to compare the engineering drawings on file to the equipment and installations of the facility. Upon comparison, discrepancies between the equipment and installations depicted in the engineering drawings and those in the field can be identified and annotated on the engineering drawings. Subsequently, the engineering drawings may be updated according to the annotations and uploaded (or re-uploaded) to a drawing management system and/or archive.

The process of conducting a field survey, identifying discrepancies between engineering drawings and a facility, and manually modifying and correcting engineering drawings is time-consuming and laborious.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method for automatically and autonomously comparing and updating, when required, the equipment and structure of a facility and one or more drawings representing the facility. The method includes obtaining a drawing from a drawing management system representing, at least, a portion of a facility and dispatching an autonomous vehicle (AV) to a location of the facility corresponding to the drawing. The method further includes collecting one or more visual images of the facility using the AV once it has reached the location and identifying discrepancies between the facility and the drawing using the one or more visual images and the drawing. The method further includes generating an updated drawing that corrects the identified discrepancies and accurately represents the facility and replacing the drawing with the updated drawing in the drawing management system upon review and approval by a user.

Embodiments disclosed herein generally relate to a system that includes a drawing management system storing a drawing representing, at least, a portion of a facility, an autonomous vehicle system (AVS) configured to dispatch an autonomous vehicle (AV) to a desired location, wherein the AV is navigated without human interaction and is configured to acquire one or more visual images upon arriving at the desired location, and a computer communicably connected to the AVS. The computer includes one or more computer processors and a non-transitory computer readable medium storing instructions executable by a computer processor. The instructions include functionality for: obtaining the drawing from the drawing management system; transmitting a signal to the AVS to dispatch the AV to the desired location corresponding the drawing; receiving the one or more visual images; identifying discrepancies between the facility and the drawing using the one or more visual images and the drawing; generating an updated drawing that corrects the identified discrepancies and accurately represents the facility; and replacing the drawing with the updated drawing in the drawing management system upon review and approval by a user.

Embodiments disclosed herein generally relate to a non-transitory computer-readable memory that includes computer-executable instructions stored thereon that, when executed on a processor, cause the processor to perform the following steps. The steps include obtaining a drawing from a drawing management system representing, at least, a portion of a facility and dispatching an autonomous vehicle (AV) to a location of the facility corresponding to the drawing. The steps further include collecting one or more visual images of the facility using the AV once it has reached the location, identifying discrepancies between the facility and the drawing using the one or more visual images and the drawing, and generating an updated drawing that corrects the identified discrepancies and accurately represents the facility. The steps further include replacing the drawing with the updated drawing in the drawing management system upon review and approval by a user.

Other aspects and advantages of the claimed subject matter will be apparent from the following description and the appended claims.

DETAILED DESCRIPTION

Figure 1:
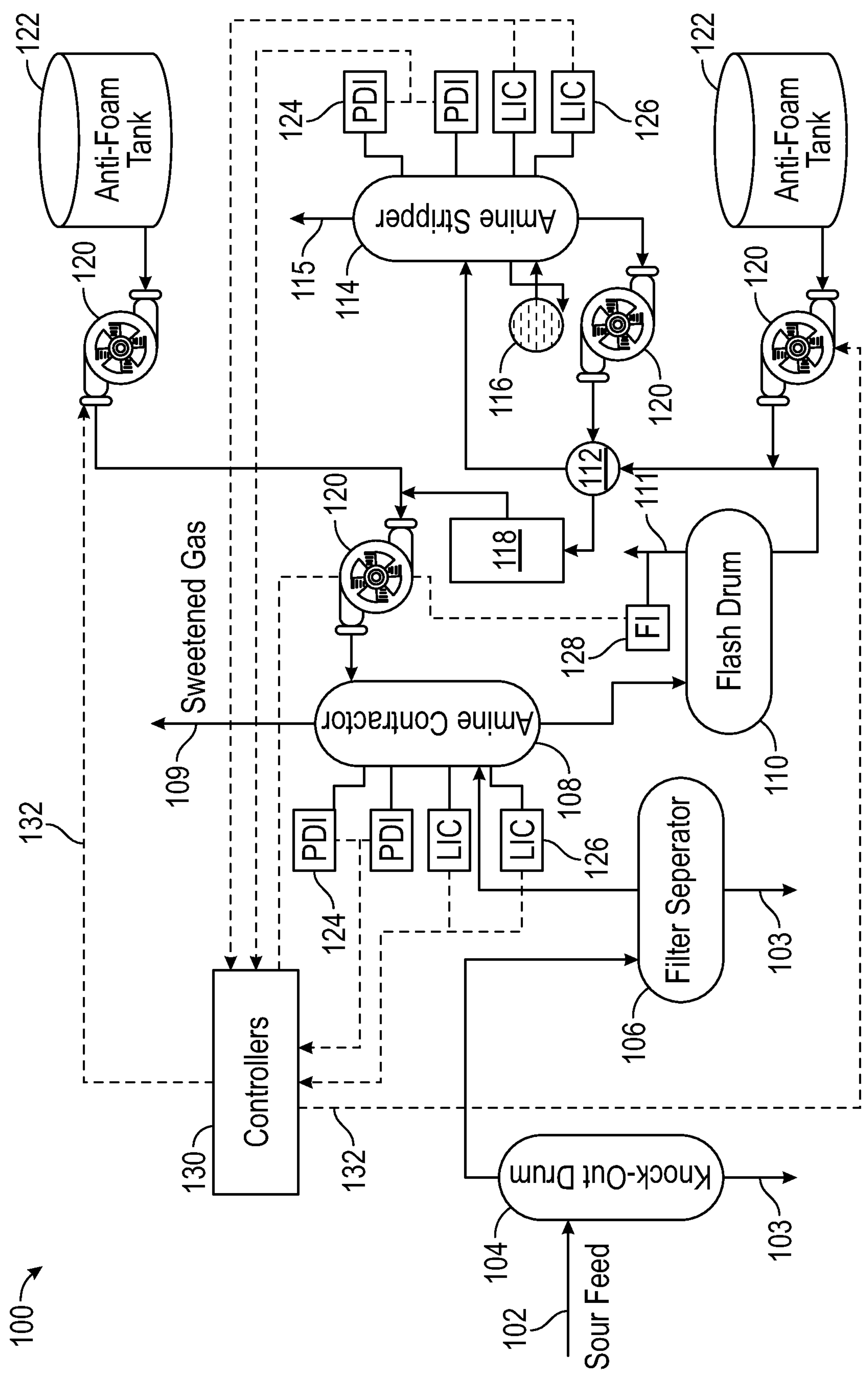
FIG. 1 depicts an example gas processing plant in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "engineering drawing" includes reference to one or more of such engineering drawings.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In one aspect, embodiments disclosed herein relate to an autonomous drawing verification and revision system that can receive or acquire one or more engineering drawings depicting a facility (such as an industrial facility and/or processing plant) and receive autonomous vehicle data corresponding to the facility, such as visual images, from one or more autonomous vehicles (AVs). The autonomous drawing verification and revision system may further automatically compare the autonomous vehicle data and engineering drawings to identify discrepancies and generate engineering drawings accurate to the facility (i.e., updated drawings). In one or more embodiments, the autonomous drawing verification and revision system can dispatch one or more AVs (e.g., drones) to a location in or near a facility to acquire autonomous vehicle data (AV data) and subsequently generate a field representation of the facility from the AV data. In one or more embodiments, the autonomous drawing verification and revision system further notifies a user of a needed or proposed change to an engineering drawing such that the engineering drawing accurately reflects the facility (or portion of the facility that the engineering drawing depicts). In one or more embodiments, the autonomous drawing verification and revision system generates an inventory of equipment contained by the facility and can determine a condition of the equipment.

In general, the autonomous drawing verification and revision system disclosed herein can be used with any industrial plant or processing facility such as, for example, gas processing plants, power plants, manufacturing facilities, transportation systems (e.g., pipelines), and industrial facilities. For simplicity, the term "facility" will be adopted herein to generalize to any type of plant or industrial facility. As stated, the autonomous drawing verification and revision system can receive, update, and in some instances, generate one or more engineering drawings. In general, engineering drawings may refer to 3D representations of one or more objects (e.g., equipment of a facility), for example, in the form of so-called "solid models," 2D representations of a facility (or a portion of a facility) such as a piping and instrumentation diagram (P&ID), or other graphical representations of an object or facility. Again, for simplicity, the term "drawing" or "drawings" will be adopted herein to generalize to any type of engineering drawing.

Turning to FIG. 1, FIG. 1 depicts a gas processing plant (100). It is noted that the gas processing plant (100) is used solely as an example of a facility where the autonomous drawing verification and revision system may be applied. As such, one with ordinary skill in the art will recognize that use of the autonomous drawing verification and revision system described herein is not limited to gas processing plants such that the depiction in FIG. 1 of an example gas processing plant do not impose a limitation on the instant disclosure.

FIG. 1 depicts the flow of a fluid through an example gas processing plant (100). One with ordinary skill in the art will recognize that gas processing plants (100) may be configured in a variety of ways according to plant-specific needs and applications. As such, the equipment and associated processes shown in FIG. 1, and their arrangement, are non-limiting. Further, a given process of a gas processing plant is often associated with a mechanical device, such as a tank or a heat exchanger. For the purposes of FIG. 1, components of the gas processing plant (100) may be described according to their process or their mechanical form without undue ambiguity. In other words, a tank or a drum may herein be described as a process or a mechanical device.

In the context of the field of oil and gas, in general, a production fluid that may contain oil, gas, water (or brine), and solid particulates is separated into its constituents and further refined. The gas processing plant (100) depicted in FIG. 1, receives a contaminated fluid, where "contamination" simply indicates the fluid is not in its desired state, processes the fluid, and produces a refined gas. Depending on the intention and design of a gas processing plant, contaminants may include solid particulates (e.g., sand), liquid hydrocarbons (e.g., oil), and water (e.g., formation brine).

As shown in FIG. 1, an incoming contaminated fluid (102) is sent to a gas processing plant (100) via a pipeline. The incoming contaminated fluid (102) may be called the "sour feed." The incoming contaminated fluid (102) may be multiphase and be composed of a variety of solid, liquid, and gaseous constituents. For example, the incoming contaminated fluid (102) may contain solid particulates like sand, mineral precipitates such as pipe scale, and corroded pipe, liquid such as water, and gases like carbon dioxide (CO2) and hydrogen sulfide (H2S). In particular, H2S, in the presence of water, is highly corrosive and should be removed to prevent a leak in the pipeline. Additionally, the incoming contaminated fluid (102) may contain liquid and gas forms of various hydrocarbons.

In the example gas processing plant (100) of FIG. 1, the incoming contaminated fluid (102), or sour feed, is processed by a knock-out drum (104). The knock-out drum (104) performs bulk separation of gas and liquid. Liquid, separated from the incoming contaminated fluid (102), exits the knock-out drum (104) through a liquid exit (103).

From the knock-out drum (104), the bulk gas is processed by a filter separator (106). A filter separator (106) removes impurities such as mineral precipitates (e.g. pipe scale), water, liquid hydrocarbons, and iron sulfide from the fluid. A filter separator (106) uses filter elements, such as a replaceable sock or a coalescing filter, rather than mechanical components to separate out contaminants. Typically, a filter separator (106) may be composed of 1 or 2 stages and may operate at high or low pressure. Again, the unwanted portions of the incoming contaminated fluid (102) exit the filter separator (106) through an exit (103).

After the filter separator (106), the incoming contaminated fluid (102) has been reduced to a gaseous stream. The gaseous stream undergoes another purifying process through an amine contactor (108). An amine contactor (108) absorbs carbon dioxide (CO2) and/or hydrogen sulfide (H2S) contaminants from the gaseous stream. In general, an amine contactor (108) receives the partially processed incoming contaminated fluid (102), or gaseous stream, and a "lean" amine liquid. Common amines are diethanolamine (DEA), monoethanolamine (MEA), methyldiethanolamine (MDEA), diisopropanolamine (DIPA), and aminoethoxyethanol (Diglycolamine) (DGA). The contact between the gaseous stream and the lean amine liquid drives the absorption of CO2 and/or H2S into the amine liquid from the gaseous stream. As a result, decontaminated gas (109), also known as "sweetened gas", may exit the amine contactor (108). The decontaminated gas (109) should be checked to make sure it meets specifications. If the decontaminated gas (109) does not meet specifications, this is indicative that control parameters within the gas processing plant (100) require adjustment. The processes of the knock-out drum (104), filter separator (106), and amine contactor (108) effectively transform the incoming contaminated fluid (102) to a decontaminated gas (109) and complete the objective of the example gas processing plant (100) shown in FIG. 1. However, in general, additional processes are required to maintain a gas processing plant (100) in an operational state. For example, the liquid amine that has absorbed the unwanted CO2 and H2S, which is called "rich" amine, is sent to an amine stripper for removal of its contaminants and re-conditioning.

As shown in FIG. 1, the contaminated amine is first sent to a flash drum (110). This process consists of throttling the contaminated amines causing a pressure drop such that vapors are formed. The vapors exit the flash drum where they undergo further processing, such as being passed to an oxidizer. These steps have been omitted from FIG. 1 for brevity.

The remaining liquid contaminated amines enter a heat exchanger (112). The heat exchanger (112) recovers heat from the decontaminated amine leaving the amine stripper (114), which is described below. Consequently, the heat exchanger (112) heats the contaminated amine before entering the amine stripper (114).

The amine stripper (114) serves to remove the absorbed contaminants, such as H2S and CO2, from the amine solution so that it can be used again in the amine contactor (108). The amine stripper (114) is equipped with a reboiler (116). The amine stripper (114) contains a tray column consisting of a stripping section and a water wash section at the top. The reboiler (116) takes the amine solution located at the bottom of the amine stripper (114) and partially boils it. Steam (hot, gaseous water) is typically used as the heat source in the reboiler (116). Steam, typically sourced from the reboiler (116), flows up the column in the amine stripper (114) and contacts the contaminated amine solution flowing down within the column. As the contaminated amine contacts the steam, it is heated up and the contaminants are stripped out of the rich amine solution and flow to the stripping section of the column.

The stripped gases, commonly referred to as amine acid gas, leaves the amine stripper through a stripped gas exit (115). The stripped gases undergo further processing, such as condensing out the water and passing the remaining acid gases to a sulfur recovery process, but these processes are not shown in FIG. 1 for brevity.

The decontaminated amine solution, leaving the bottom of the amine stripper (114), contains very low quantities of acid gas (such as H2S). This decontaminated amine solution may be recycled in a lean amine storage tank (not shown) and/or returned to the amine contactor (108). As shown in FIG. 1, the decontaminated amine solution leaving the amine stripper (114) is passed through the heat exchanger (112), to transfer heat to the contaminated amine solution leaving the flash drum (110). After passing through the heat exchanger (112), the decontaminated amine solution may be further cooled in a cooler (118) before being returned to the amine contactor (108).

The transport of the various fluids of the gas processing plant of FIG. 1 is facilitated by a plurality of pumps and/or compressors (120) disposed throughout the system. The type of pump or compressor (120), and the location may be altered and arranged according to plant-specific needs.

As noted above, it is emphasized that a gas processing facility (100) may implement different processes and mechanisms for achieving adequate gas processing. Some processes may include compression, stabilization, and dehydration. The gas processing plant (100) may also encompass the treatment of removed water for disposal through processes such as filtration and deionization. Additionally, elements for heating and cooling may be provided to prevent the formation of hydrates, and mitigate corrosion and aid in dehydration, respectively. With respect to decontaminating the incoming contaminated fluid (102), other chemical and physical washes may be used without departing from the scope of this disclosure.

As shown in FIG. 1, the processes may be monitored and controlled by a plurality of sensors and controllers. As an example, the amine contactor (108) and amine stripper (114) are both equipped with pressure differential indicators (PDI) (124) and level indicators (LIC) (126) in FIG. 1. Additionally, FIG. 1 depicts a flow indicator (FI) (128) connected to the exit of the flashed gases exiting the flash drum (110). The PDIs, LICs, and FIs, which are sensors, may send information regarding the pressure difference measured across processes, the quantity and level of fluids present, and the flow rate of fluids, respectively, to one or more controllers (130). Flow indicators (FIs) disposed throughout the gas processing plant (100) may be multiphase flow indicators. In some embodiments, one or more gas leak sensors (180), selected to detect one or more expected gas compositions to be present in the gas processing plant (100), may also be provided at one or more locations in the gas processing plant (100) (e.g., on one or more pipes or equipment units). In one or more embodiments, one or more environmental sensors (190) are provided at one or more locations in the gas processing plant (100) (e.g., a wind speed (WS) sensor and a wind direction (WD) sensor). More information regarding environmental sensors is provided later in the instant disclosure.

The one or more controllers (130) may herein be referred to as "controllers" or "controller" where appropriate. Controllers (130) may be distributed, local to the processes and associated device, global, connected, etc. Controllers (130) may include or consist of a programmable logic controller (PLC), a distributed control system (DCS), a supervisory control and data acquisition (SCADA), and/or a remote terminal unit (RTU). For example, a programmable logic controller (PLC) may control valve states, fluid levels, pipe pressures, warning alarms, and/or pressure releases throughout a gas processing plant (100). In particular, a programmable logic controller (PLC) may be a ruggedized computer system with functionality to withstand vibrations, extreme temperatures, wet conditions, and/or dusty conditions, for example, around a refinery. A distributed control system may be a computer system for managing various processes at a gas processing plant (100) using multiple control loops. As such, a distributed control system may include various autonomous controllers (130) (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a gas processing facility (100) as well as remote control outside the facility. With respect to an RTU, an RTU may include hardware and/or software, such as a microprocessor, that connects sensors and/or actuators using network connections to perform various processes in the automation system. Likewise, a control system may be coupled to one or more gas processing plant (100) devices.

FIG. 1 also depicts anti-foam tanks (122) which contain an anti-foaming agent that may be injected, by use of a pump (120) and a controller (130), into different parts of the gas processing system as indicated by the dashed line (132). The anti-foam tanks (122) and injection of an anti-foaming agent into the sub-processes of the gas processing plant (100) may be necessary because a frequent problem in gas processing plants (100) is foaming.

In general, facilities such as the example gas processing plant (100) of FIG. 1 are composed of many pieces of equipment, where the relation of equipment (e.g., order or equipment) and connectivity of equipment is important. In other words, a facility is not a collection of detached or otherwise disembodied equipment items. Facilities continuously undergo modifications to equipment. These modifications may be the result of maintenance and repair operations, equipment upgrades, and/or other operational activities. These modifications are typically executed through a management of change (MOC) process that involves updating one or more drawings representative of the facility (e.g., process & instrumentation diagrams (P&IDs)). However, in many instances, although facilities may have an established MOC process, the associated drawings do not reflect actual field installations.

There are several reasons why one or more drawings may not accurately represent a facility. In some instances, equipment of a facility may be modified in a manner different than that prescribed in a set of design or modification drawings. For example, an installation or repair crew may encounter previously unknown constraints when implementing a modification and may alter an aspect of the modification on-the-fly in view of the newly recognized constraints. In such a case, the drawings on file will not accurately represent the facility as modified. In other instances, a modification may be implemented outside of an established MOC process such that an update to the drawings to reflect the modification is never triggered. In other instances, drawings may not accurately represent a facility because the drawings themselves were incorrectly produced or erroneously updated after a modification to the facility. Similarly, incorrect drawings on file may be the result of human error, for example, through a mistake made while converting a physical drawing (e.g., paper) or markup to a digital drawing (e.g., using a computer aided design and drafting (CADD) software).

Regardless of the reason or origin of drawings that do not accurately represent a facility, inaccurate drawings may result in financial costs and safety hazards. Further, discrepancies in drawings may cause issues for various aspects of managing a facility, including engineering, operations, and maintenance. For example, inaccurate drawings consume time, with an associated financial cost, in terms of delays in the normal operation of a facility due to the necessity to determine, upon identifying a discrepancy between drawings and facility, whether a drawing or equipment item(s) require correction and then implementing said correction. Such a correction may require rework, redesign, and in some cases reimplementation which can be costly. Another issue related to inaccurate drawing is that of safety where decisions made based on inaccurate drawings can lead to serious safety hazards and injuries to operators of the facility (including loss of life).

Conventionally, to ensure that drawings accurately represent a facility, a physical audit or field survey is conducted to compare the drawings on file to the equipment and installations of the facility. Upon comparison, discrepancies between the equipment and installations depicted in the drawings and those in the field can be identified and annotated on the engineering drawings. Subsequently, the engineering drawings may be updated according to the annotations and uploaded (or re-uploaded) to a drawing management system and/or archive.

Conventionally, the process of auditing and updating drawings is performed manually. This manual process begins by conducting an in-person field survey. Typically, the in-person field survey consists of an engineer or auditor acquiring a physical copy of the drawings for a facility (or the portion of a facility that recently underwent a modification) and travelling to the facility to visually inspect the facility and compare it to the drawings in-hand. For example, the drawings may be obtained from a drawing management system, or other database, and processed with a printer to form a physical copy. If, while visually inspecting the facility, the engineer or auditor identifies a difference between the facility and the drawings, the engineer or auditor physically marks up the drawings on-site to indicate the difference. In some instances, the engineer or auditor physically marks up the drawings to indicate how the drawings should be updated to accurately represent the facility. Afterward, the engineer or auditor returns from the facility and transfers any markups placed on the physical drawings to a digital representation of the drawings. That is, the engineer or auditor performs a digital markup of the drawings. The digitally marked up drawings may be submitted to a computer aided design and drafting (CADD) group. The CADD group reviews and approves any changes indicated by the digitally marked up drawings. Further, the CADD group updates the digital version of the drawings according to the details of the digitally marked up versions. That is, any markups are implemented to produce a "clean" drawing accurate to the facility. Finally, the clean, or updated digital version of the drawings, are uploaded (or re-uploaded) to a document management system for storage and future retrieval as needed. The document management system may be a database or archive system. In some instances, the document management system may have an interactive interface and further allow for drafting capabilities. In such a case, the CADD group may operate within the document management system. This manual process and associated steps are laborious. Further, nearly each step requires human intervention. As such, the conventional process of auditing and updating drawings may be considered slow and costly.

Figure 2:
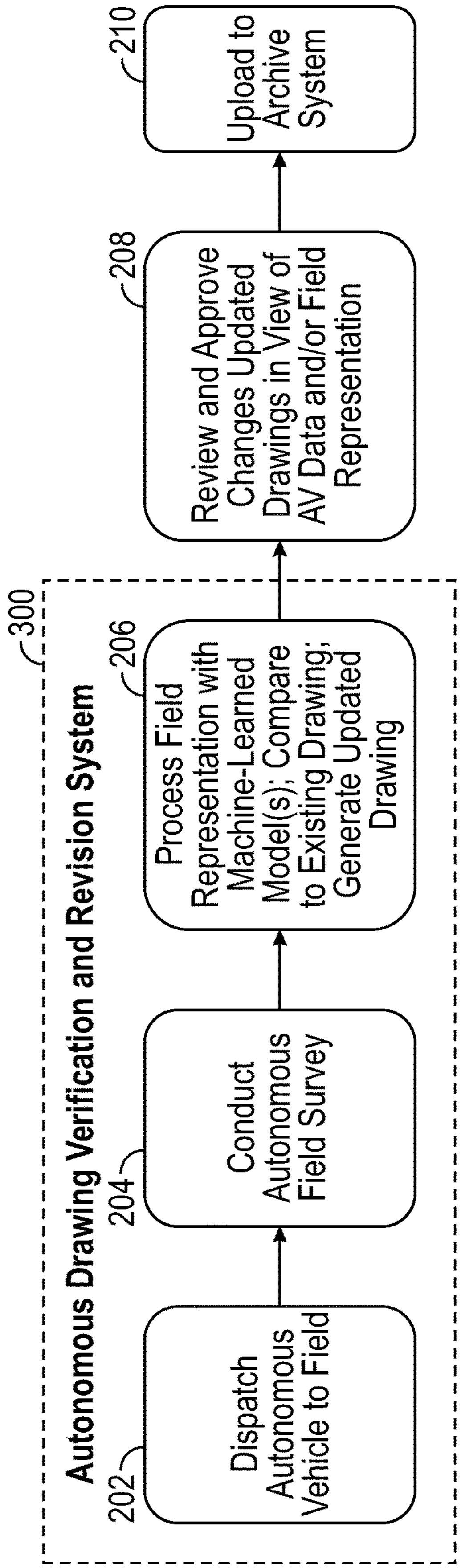
FIG. 2 depicts a flowchart in accordance with one or more embodiments.

In accordance with one or more embodiments, the autonomous drawing verification and revision system automates and consolidates the steps of conducting a field survey, identifying discrepancies between drawings and a facility, marking up drawings, and producing a new or updated clean drawing accurate to the facility. FIG. 2 depicts a high-level flowchart outlining the process of auditing and updating drawings while using the autonomous drawing verification and revision system, in accordance with one or more embodiments. In Block 202, one or more autonomous vehicles (AVs) are dispatched to the field (i.e., to the facility or to a specific location of the facility). As will be described, an AV may be dispatched according to a schedule (e.g., a time-based audit), according to a user-provided instruction, and/or in coordination with a known modification to the facility (e.g., after a maintenance, repair, or update modification). In Block 204, the one or more AVs conducts an autonomous field survey. In one or more embodiments, dispatched AVs collect autonomous vehicle data (AV data), such as visual images using a camera, of the facility. In one or more embodiments, the AV data is used to form a field representation, where the field representation is representative of the true and current state of the facility. As will be discussed below, the field representation may be visual images, a 2D or 3D depiction of the facility generated from AV data, or a data object such as a directed graph indicating the spatial location and connectivity of facility equipment. In Block 206, the field representation is processed using one or more machine-learned models alongside existing drawings of the facility. In one or more embodiments, the one or more machine-learned models identify any discrepancies between the existing drawings and the field representation. Subsequently, in one or more embodiments, the existing drawings are marked up to align with the field representation. In one or more embodiments, the autonomous drawing verification and revision system further generates, or modifies an existing drawing according to the mark ups, to form an updated, clean, drawing. In Block 208, a human operator, such as a member of a CADD group, reviews and approves the updated drawings in view of the AV data and/or field representation. Finally, upon approval the updated drawings are uploaded to the archive system (or data management system) in Block 210. As shown in FIG. 2, the autonomous drawing verification and revision system (300) encompasses and performs the steps of Blocks 202, 204, and 206—all without human intervention. Consequently, the autonomous drawing verification and revision system (300) reduces the labor and time required to audit and update drawings of a facility resulting in economic savings and an improvement in safety.

Figure 3:
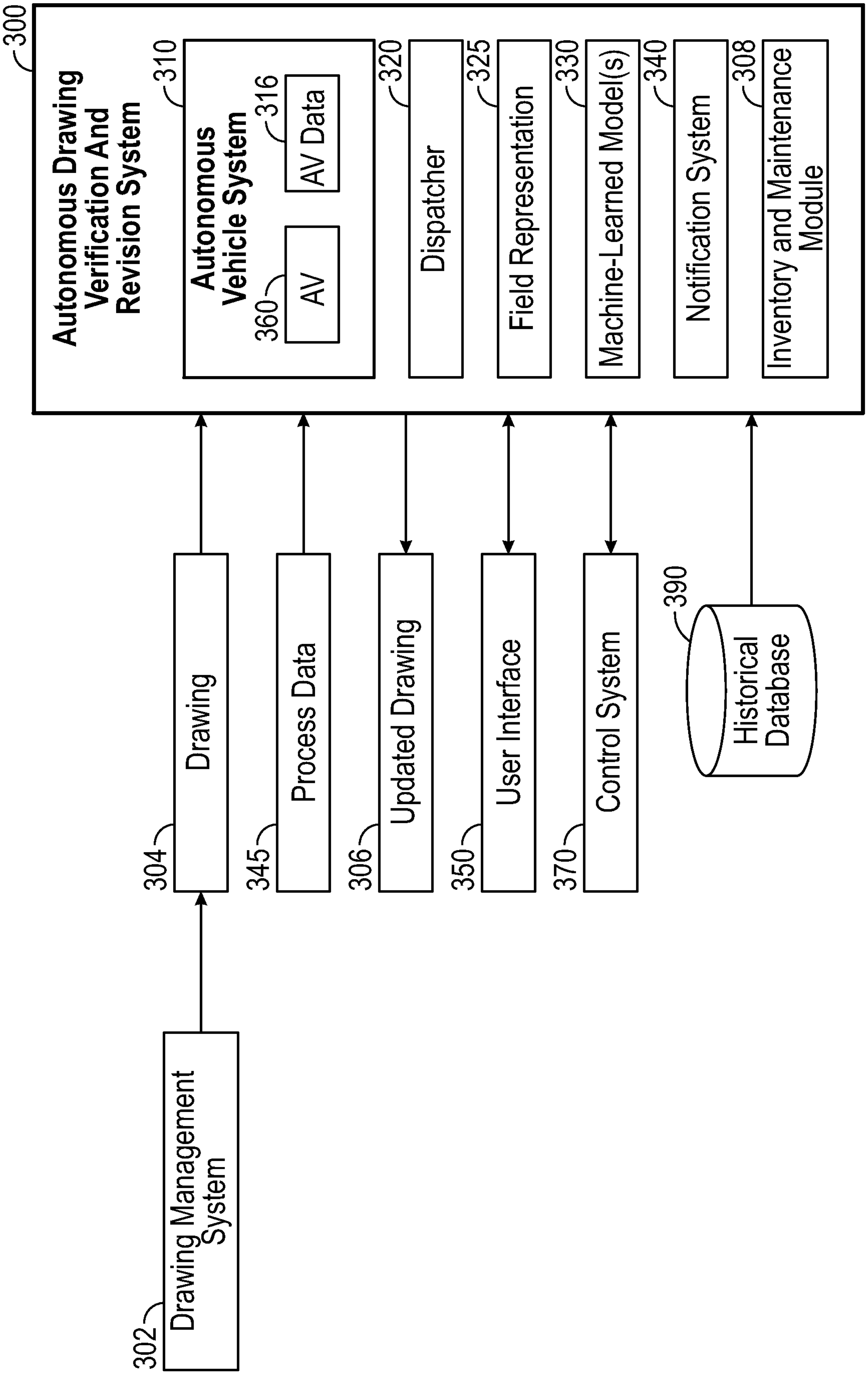
FIG. 3 depicts a system in accordance with one or more embodiments.

FIG. 3 depicts the autonomous drawing verification and revision system (300) in accordance with one or more embodiments. In FIG. 3, the autonomous drawing verification and revision system (300) is depicted as being composed of various components and/or modules, where the components and/or modules may interact with each other. One with ordinary skill in the art will recognize that the partitioning, organization, and interaction of the components and/or modules of the autonomous drawing verification and revision system (300) in FIG. 3 is intended to promote clear discussion and should not be considered fixed or limiting. For example, FIG. 3 depicts an autonomous vehicle system (AVS) (310) and a dispatcher (320) as separate and independent entities, however, in one or more embodiments, the functionality provided by these components and/or modules may be performed by a single system or module.

In one or more embodiments, the autonomous drawing verification and revision system (300) such that it can receive or otherwise acquire a drawing (304) from a drawing management system (302). The drawing (304) may depict, or otherwise represent, a facility (or a portion of a facility). In one or more embodiments, the drawing is a piping and instrumentation diagram (P&ID). In one or more embodiments, the drawing (304) indicates two or more equipment items, as well as their relationship to each other (e.g., spatial relationship), connectivity (if applicable), and order when equipment items may be described ordinally (e.g., ordered processes associated with the equipment items).

In accordance with one or more embodiments, the autonomous drawing verification and revision system (300) is configured to receive process data (345). Process data (345) includes any control parameters or sensor data associated with a facility. For example, considering the example gas processing plant (100) of FIG. 1, process data (345) may include measurements acquired by pressure differential indicators (PDI) (124), level indicators (LIC) (126), and flow indicators (FI) (128). Process data (345) may further include pump (120) settings and any data generally received, transmitted, or controlled by controllers (130) (e.g., a distributed control system (DCS)). In one or more embodiments, process data (345) may be used to identify a location of the facility to which an autonomous vehicle (AV) (360) should be dispatched.

In accordance with one or more embodiments, the autonomous drawing verification and revision system (300) includes an autonomous vehicle system (AVS) (310). The AVS (310) includes one or more AVs (360) that may be dispatched to a location of a facility. The present disclosure places no restrictions on the type of AV (360) employed by the AVS (310). In general, an AV (360) may be a robotic device such as a wheel or track propelled vehicle or a drone. In the instance of a drone, the drone may be of a fix-wing type or a rotary-wing type (e.g., quadcopter, tricopter, etc.).

In one or more embodiments, one or more AVs (360) may be dispatched by the autonomous drawing verification and revision system (300) to a location of the facility by the dispatcher (320). The dispatcher (320) will be described in greater detail below. In one or more embodiments, each AV (360) may operate autonomously without the need for human guidance and/or control. In general, each AV (360) of the AVS (310) possesses one or more cameras and an object detection and avoidance system. In some embodiments, the AV (360) further includes additional sensors, such as ultrasonic sensors and light detection and ranging (LiDAR) sensors to detect the presence and proximity of objects surrounding the AV (360). An AV (360) may further include global positioning system (GPS) components for positioning, navigation, and timing (PNT) services. The object detection and avoidance system is configured to receive sensory inputs from the AV (360), for example, visual data acquired from the one or more cameras, object proximity data, and GPS data. The object detection and avoidance system may fuse sensory inputs to maneuver the AV (360) to a desired location (e.g., an area of a facility that underwent an equipment modification) without colliding with an object (e.g., a flue-gas stack).

In one or more embodiments, an AV (360) of the AVS (310) possesses thermal imaging capabilities. Thermal imaging may be performed using a thermal camera, for example, a camera outfitted with an infrared sensor sensitive to infrared light. That is, in one or more embodiments, an AV (360) includes both a visual camera and a thermal camera. In some embodiments, both visual imaging and thermal imaging are performed using the same camera using one or more photosensors and/or light filters (i.e., a filter that limits incoming light according to frequency (or wavelength)). Thermal images acquired by the AV (360) may be used to detect and locate objects and/or equipment items at elevated temperatures which may aid in the recognition of equipment items.

In accordance with one or more embodiments, an AV (360) of the AVS (310) can simultaneously self-locate and map its surrounding environment, a process known as simultaneous localization and mapping (SLAM). Generally, SLAM is a method used principally by autonomous vehicles to map (spatially orient surrounding objects) and localize the vehicle in that map at the same time. In one or more embodiments, a SLAM algorithm may facilitate or be a part of the object detection and avoidance system of the AV (360). Further, a SLAM algorithm may be used to plan a path for the AV (360) to travel in order to safely arrive at desired destination. The SLAM algorithm can run in real time or traceable time. Methods used by the SLAM algorithm may include, but are not limited to: particle filter; extended Kalman filter; and covariance intersection.

Each of the one or more AVs (360) can communicate with the autonomous drawing verification and revision system (300) and thus components of the autonomous drawing verification and revision system (300). Communication may be enabled through wireless or wired connections or a combination of wireless and wired connections. Wireless communication may be facilitated through RFID, NFC, low-energy Bluetooth, low-energy wireless, low-energy radio protocols, LTE-A, and WiFi-Direct technologies. In one or more embodiments, an AV (360) communicates with the autonomous drawing verification and revision system (300), or its components and/or modules, using a wireless protocol. In other embodiments, an AV (360) establishes a wireless link with a ground control system and the ground control system has a wired connection (e.g., ethernet, USB, etc.) with the autonomous drawing verification and revision system (300). In general, one or more ground control stations may be disposed throughout, or near, a facility. In one or more embodiments, ground control systems further act as docking and charging stations for one or more AVs (360) when not in use. Communication between an AV (360) and the autonomous drawing verification and revision system (300) includes any transferred data and control signals that may be sent bidirectionally between an AV (360) and autonomous drawing verification and revision system (300). For example, an AV (360) may transfer, through an established communication link, its location and acquired visual images to the autonomous drawing verification and revision system (300). Likewise, the autonomous drawing verification and revision system (300) may send a control signal to the AV (360) specifying a target destination for the AV (360). Other data that may be communicated between an AV (360) and the autonomous drawing verification and revision system (300), including the battery level of the AV (360) and operational parameters of the AV (360) (e.g., internal temperature, rotary speeds, etc.). Herein, data sent, transferred, or communicated to the autonomous drawing verification and revision system (300) from the one or more AVs (360) is referred to a AV data (316).

In one or more embodiments, the autonomous drawing verification and revision system (300) may perform photogrammetric analysis using received AV data (316). Photogrammetry, defined generally, is the process of collecting and/or displaying physical information from two-dimensional (2D) photos or images. Thus, in one or more embodiments, the autonomous drawing verification and revision system (300) processes one or more images acquired by an AV (360) (and received as AV data (316)) to form a field representation (325). In accordance with one or more embodiments, AV data (316) may undergo preprocessing. For example, preprocessing of acquired visual images may include normalizing the images. Additional techniques such as aggregating multiple images, or other methods designed to reduce noise in an image and increase image quality may be employed. One with ordinary skill in the art will appreciate that many image preprocessing techniques exist and the fact that they are not enumerated herein does not impose a limit on the present disclosure. In some embodiments, preprocessing may not be required.

In accordance with one or more embodiments, the field representation (325) is a digital representation of the facility (or portion of the facility) developed using AV data (316). In one or more embodiments, the field representation simply consists of images acquired using one or more AVs (360), where the images may include metadata regarding the location and orientation of the AV (360) while the images were acquired. In one or more embodiments, the field representation (325) is a 2D or 3D representation of the facility generated from the AV data (316). In one or more embodiments, the field representation (325) is a 2D diagram of the region or area represented in the received image(s), such as the depiction of a gas processing plant (100) in FIG. 1. In other embodiments, the autonomous drawing verification and revision system (300) generates a piping and instrumentation diagram (P&ID) of the represented area or region for use as a field representation (325).

In one or more embodiments, the computational requirement or burden of an AV (360) is reduced by performing calculations using one or more computers included in the autonomous drawing verification and revision system (300) (computers such as that depicted in FIG. 7) or by one or more ground control systems. For example, in one or more embodiments, an AV (360) transmits its position and acquired visual image(s) to the autonomous drawing verification and revision system (300) and an object detection routine or method is performed using one of the one or more computers of the autonomous drawing verification and revision system (300). Upon detection of object(s), an AV path or flight plan may be transmitted from the autonomous drawing verification and revision system (300) to the AV (360). In one or more embodiments, object detection from acquired visual image(s) is performed using one or more machine-learned models (e.g., a convolutional neural network) and/or computer vision techniques. General concepts of machine-learning will be described in greater detail later in the instant disclosure. For now, however, it is noted that in one or more embodiments the autonomous drawing verification and revision system (300) is connected to a historical database (390). The historical database may include acquired visual and thermal images of one or more facilities as well as accompanying labels or annotations such as field representations and/or labelled equipment items. As such, in instances where a machine-learned model is employed by the autonomous drawing verification and revision system (300), the machine-learned model may be "trained" using the historical database. Again, a basic introduction to training a machine-learned model is presented later in the instant disclosure.

In accordance with one or more embodiments, the autonomous drawing verification and revision system (300) further includes a dispatcher (320). The dispatcher (320) determines when, and where, an AV (360) should be sent to inspect a facility. In one or more embodiments, the dispatcher (320) operates according to a schedule, where one or more AVs (360) are dispatched to a location of the facility according to a pre-determined frequency. That is, the dispatcher (320) may mandate that a field survey is conducted using one or more AVs (360) every X days, where X is defined by a user. In one or more embodiments, the dispatcher (320) is configured such that an entire facility is inspected every 60 days. In such a case, the dispatcher (320) may inspect portions of a facility over various intervals within the prescribed time period to complete an entire facility inspection. In one or more embodiments, the dispatcher (320) may further be configured to dispatch one or more AVs (360) to conduct a field survey of a facility based on one or more pre-defined triggers or identified events. For example, the dispatcher (320) may dispatch an AV (360) to a location of a facility where a maintenance, repair, replacement, or update activity was recently performed. In such a case, the autonomous drawing verification and revision system (300) may ensure that the drawings (304) in the drawing management system (302) are aligned (or still aligned) with the facility after said maintenance, repair, replacement, or update activity. In one or more embodiments, the dispatcher (320) may further be configured to receive a user input, for example, through a user interface (390), such that a user may instruct one or more AVs (360) to inspect any portion of a facility at any given time according to the requirements of the user.

In accordance with one or more embodiments, the autonomous drawing verification and revision system (300) further includes an inventory and maintenance module (308). As the autonomous drawing verification and revision system (300) identifies the equipment items that make up a facility, the inventory and maintenance module (308) maintains a current inventory or list of all equipment items. Further, in one or more embodiments, the autonomous drawing verification and revision system (300) is further configured to analyze the AV data (316) to determine the condition of identified equipment items. For example, the inventory and maintenance module (308) may make use of one or more of the machine-learned models (330) to categorize the condition of each equipment item given the AV data (316). In this manner, while conducting autonomous field surveys, the autonomous drawing verification and revision system (300) may further determine which equipment items are in need of repair or replacement. In one or more embodiments, the autonomous drawing verification and revision system (300) recommends one or more maintenance options to a user and/or facility operator through the notification system (340). Recommendations produced by the inventory and maintenance module (308) may be proactive or reactive in nature. That is, the inventory and maintenance module (308), through analysis of AV data (316), may identify an equipment item in need of immediate maintenance or replacement and recommend a reactive option or the inventory and maintenance module (308) may identify an equipment item that will be in need of maintenance sooner than expected according to a maintenance schedule (a proactive option). As such, in one or more embodiments, the inventory and maintenance module (308) has access to, or is provided, a maintenance schedule (not shown in FIG. 3) including a historical record of maintenance operations performed on the facility as well as the scheduled dates for maintenance activities on equipment items of the facility.

In accordance with one or more embodiments, the facility is monitored and controlled by a control system (370). Examples of a control system (370) may include a distributed control system (DCS) and a supervisory control and data acquisition (SCADA) system. In one or more embodiments, the control system (370) is the same as—or analogous with—the controllers (130) depicted in FIG. 1. In one or more embodiments, the autonomous drawing verification and revision system (300) can interact and exchange data with the control system (230). For example, in or more embodiments, the autonomous drawing verification and revision system (300) may instruct (e.g., via a command signal) the control system (230) to shut down or stop one or more processes and/or pieces of equipment that may be incorrectly installed, oriented, or operated in view of the drawings (304).

The principal output of the autonomous drawing verification and revision system (300) is an updated drawing (306). Upon conducting an autonomous field survey and developing a field representation (325) from the AV data (316), the field representation (325) is compared to an existing drawing (304). The comparison may take a variety of forms. In one or more embodiments, the field representation is an engineering drawing of the same type and style as the existing drawing (304) such that the autonomous drawing verification and revision system (300) can perform a direct comparison between the field representation (325) and the existing drawing (304). In one or more embodiments, conversion of AV data (316) to a field representation (325) of the same type and style as the existing, or current, drawing (304) is facilitated by one or more machine-learned models (330). The one or more machine-learned models (330) may be configured for object detection and image segmentation tasks. For example, in one or more embodiments, UV data (216) in the form of images and, in some instances, other data such as spatial distances from ultrasonic and/or LiDAR sensors, are used to construct 3D isometrics through edge computing. Then, the autonomous drawing verification and revision system (300) further converts the 3D isometric representation(s) into 2D P&ID(s) to match the existing format of the drawings (304) in the drawing management system (302). In one or more embodiments, one or more machine-learned models (330) accepts the AV data (316) and/or the field representation (325) (where the field representation itself may be formed using a machine-learned model) and extracts relevant features from the received input. Features may include, but are not limited to identified and labelled equipment as well as descriptors for various equipment items such as equipment size, color, orientation, relative position, etc. The extracted features are subsequently matched with corresponding features on the current drawing (304), where the current drawing may be 2D (e.g., P&ID) or 3D (e.g., isometric drawing). In one or more embodiments, the drawing (204) and the field representation (325) are each received by one or more machine-learned models (330) and are each converted to a data object, such as a directed graph. The data object (e.g., directed graph) is a compact representation of the equipment, and relationship between equipment items, of a facility. The data objects are orientation invariant such that alternative viewpoints of a facility (e.g., AV data acquired from two or more AVs (360) from different locations and perspectives) result in the same data object. By converting both the drawing (304) and field representation (325), where the field representation (325) may be raw AV data (316) (e.g., images and location metadata), to an orientation invariant data object, direct comparison of the data objects allows for the quick identification of discrepancies, if any, between the facility and the drawing (304).

In one or more embodiments, when at least one discrepancy between the drawing (304) and the facility is detected by the autonomous drawing verification and revision system (300), the autonomous drawing verification and revision system (300) outputs an updated drawing (306). In one or more embodiments, the updated drawing (306) is a marked-up version of the drawing (304) that overlays the corrections needed on the drawing (304). The overlaid corrections, or markups, are such that once used to alter the drawing (304), the resulting drawing will accurately represent the facility. In one or more embodiments, the updated drawing (306) is a clean (i.e., without markups) drawing that can be used to replace the drawing (304) in the drawing management system (302), where the updated drawing (306) accurately represents the facility.

Once an updated drawing (306) is produced, the updated drawing (306) may be reviewed and approved by a user (e.g., a CADD group member) before the updated drawing (306) is used to correct or replace the existing drawing (304) in the drawing management system (302). The updated drawing (304) may be reviewed alongside the original drawing (304) and the field representation (325) and/or AV data (316). If the updated drawing (306) is not approved upon review, a subject matter expert (e.g., a facility operator and/or a CADD group member) may revert to producing an updated drawing manually using the field representation (325) and/or AV data (316).

In accordance with one or more embodiments, the autonomous drawing verification and revision system (300) further includes a notification system (340). The notification system (340) provides, at least, notification functionalities to the autonomous drawing verification and revision system (300). Notifications simply refer to alerting one or more users that an updated drawing (306) has been produced by the autonomous drawing verification and revision system (300) and is ready for review and approval. Notifications may be provided by the notification system (340) in the form of email, SMS notifications, and other alerts through a user interface (350).

In one or more embodiments, one or more users may interact with the autonomous drawing verification and revision system (300) through a user interface (350). In one or more embodiments, the user interface (350) is a graphical user interface. The user interface (350) acts as a point of human-computer interaction and communication. Thus, the user interface (350) can receive inputs from a user. The user interface (350) may further provide visualizations, such as graphs, reports, and text and image data, to one or more users. In broad terms, the user interface (350) can include display screens, keyboards, and a computer mouse. In one or more embodiments, the user interface (350) is implemented as a computer program, such as a native application or a web application.

Figure 4A:
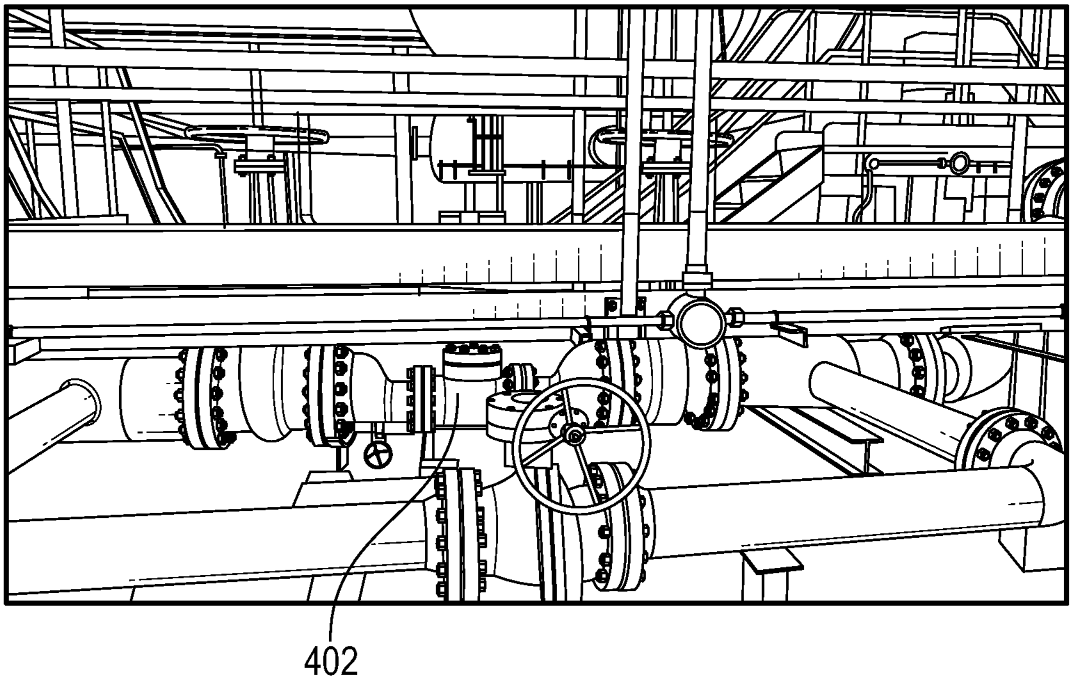
FIG. 4A depicts a first example field image in accordance with one or more embodiments.
Figure 4B:
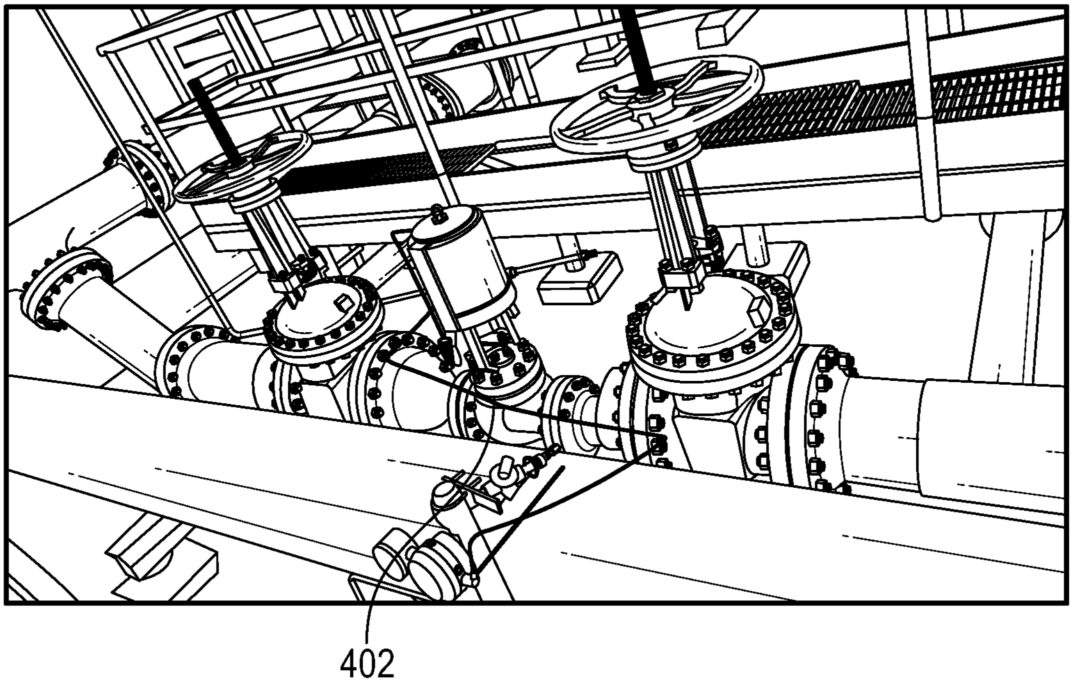
FIG. 4B depicts a second example field image in accordance with one or more embodiments.
Figure 4C:
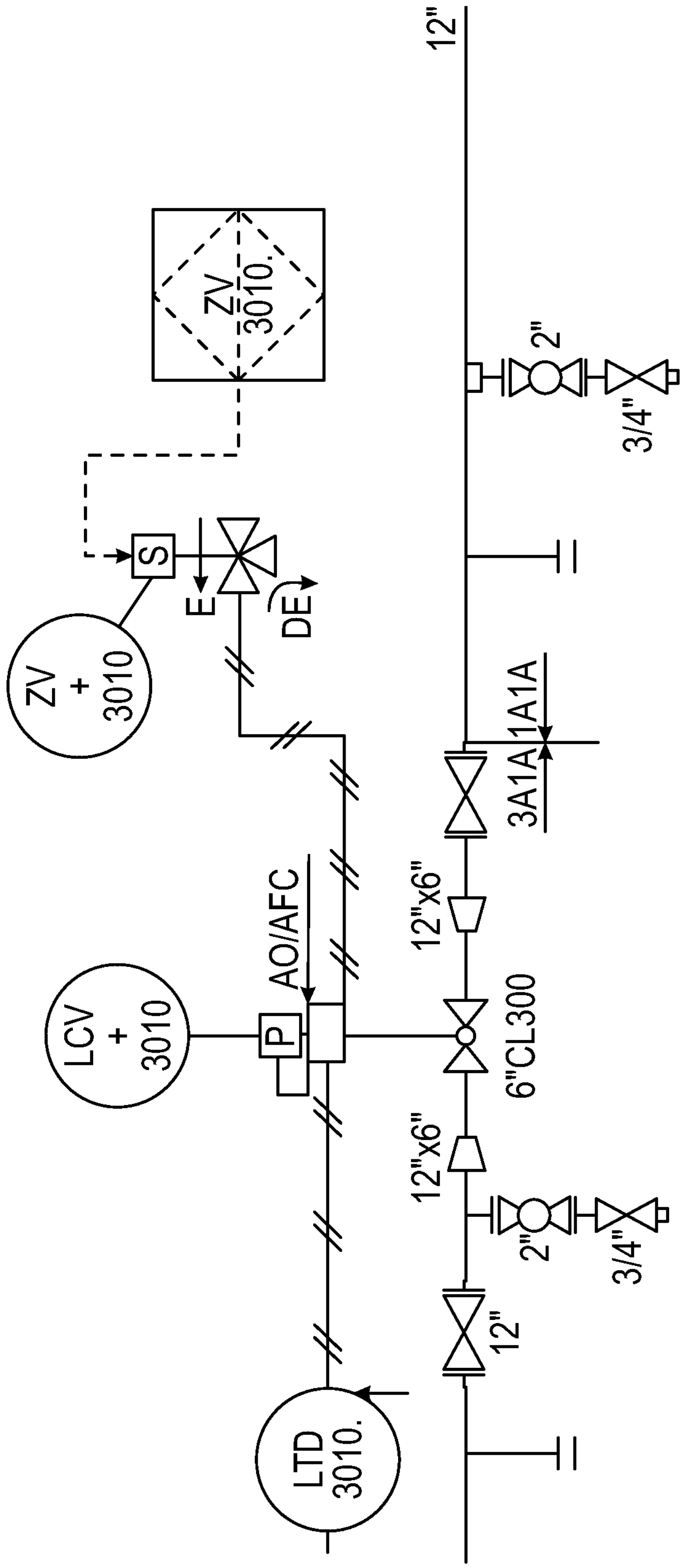
FIG. 4C depicts an example piping and instrumentation diagram associated with the first and second example field images in accordance with one or more embodiments.
Figure 4D:
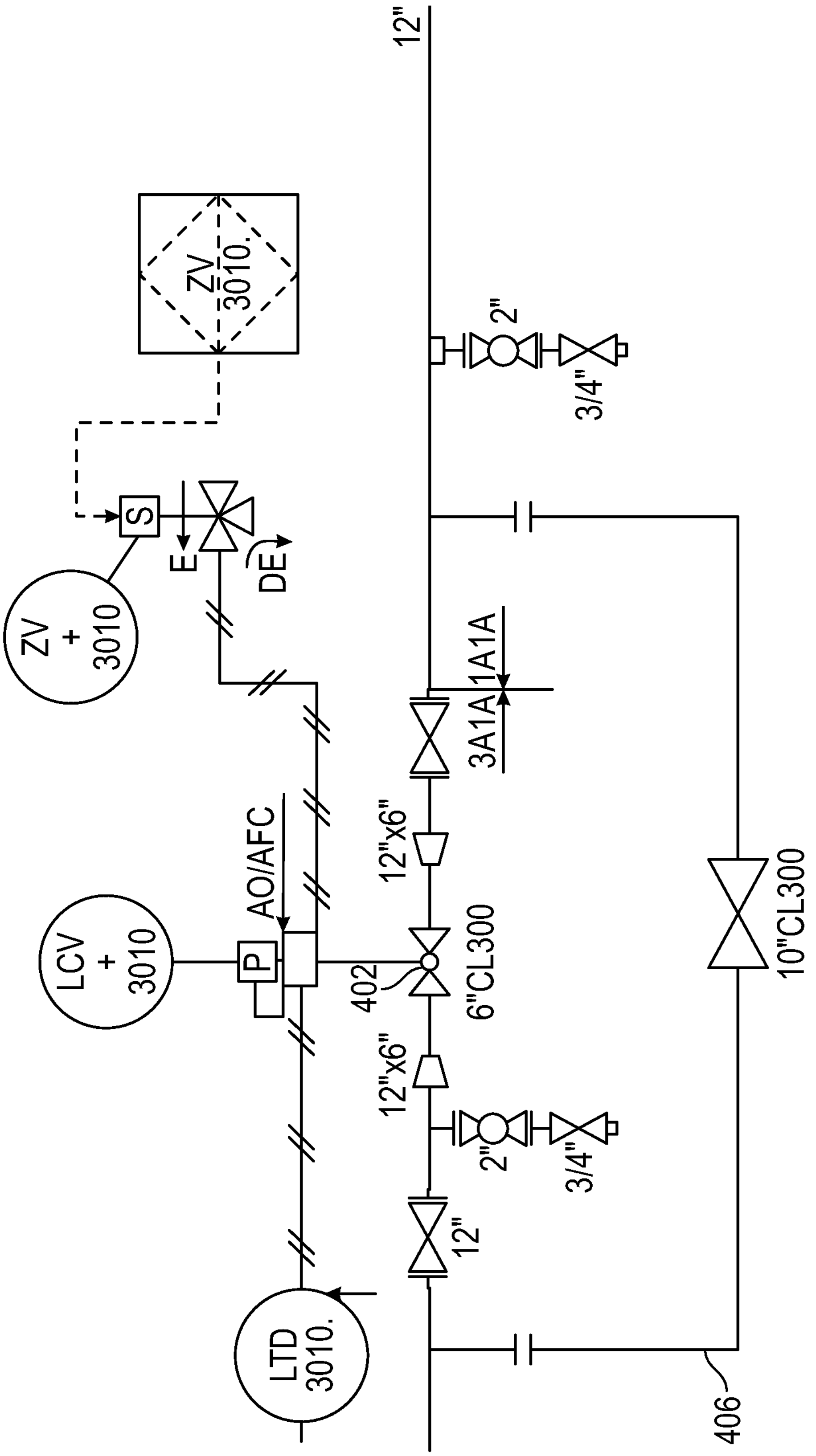
FIG. 4D depicts an example piping and instrumentation diagram associated with the first and second example field images and further updated to reflect those images in accordance with one or more embodiments.

FIGS. 4A and 4B are example images of a portion of a facility acquired using an AV (360). A P&ID drawing from a drawing management system (302) that corresponds to the portion of the facility where the images of FIGS. 4A and 4B were acquired is depicted in FIG. 4C. In this example, the autonomous drawing verification and revision system (300), using the acquired images, detects and identifies, among other things, a control valve (402). In accordance with one or more embodiments, the autonomous drawing verification and revision system (300) is adept at recognizing the technical details of equipment items such as the control valve (402) using physical characteristics of the equipment items (e.g., shape, size, color, orientation, etc.). Further, in one or more embodiments, the autonomous drawing verification and revision system (300) may use optical character recognition (OCR) to effectively "read" a label on an equipment item. As such, the autonomous drawing verification and revision system (300) can identify various variants of control valves, or other equipment items, with high precision. Continuing with the example, the autonomous drawing verification and revision system (300) is able to recognize that the control valve (402) is a 6-inch, 300 lb. ANSI globe valve. According to standardized drawing practices, such a valve is annotated as LCV-3010 in P&IDs. As such, the autonomous drawing verification and revision system (300) is able to compare the identified control valve (402), including determining the technical specifications of the control valve (402), with the drawing (304) on file depicted in FIG. 4C. As seen in FIG. 4C, the control valve is specified to be a LCV-3010 control valve. So, with respect to the control valve (402), no discrepancy between the AV (360) acquired images and the P&ID on file is detected. However, the autonomous drawing verification and revision system (300) does detect the presence of a control valve bypass line that is present in the images of FIGS. 4A and 4B but not depicted in the associated P&ID of FIG. 4C. As such, in one or more embodiments, the autonomous drawing verification and revision system (300) will produce an updated drawing (306) depicting the presence of the control valve bypass line. An example updated drawing (306), as updated by the autonomous drawing verification and revision system (300), is depicted in FIG. 4D. As seen, the control valve bypass line (406) has been added to the updated drawing (306). It is further noted that the technical specifications of the control valve on the bypass line have been identified, by the autonomous drawing verification and revision system (300), and that these specifications are properly annotated on the updated P&ID of FIG. 4D.

It is emphasized that while the example of FIGS. 4A-4D depicts the identification of a control valve (402) and a control valve bypass line, that these specific equipment items are discussed herein as an example of an equipment item that is accurately portrayed in a drawing (the LCV-3010 control valve (402)) and an equipment item that is missing in the drawing (the control valve bypass line). However, in practice, the autonomous drawing verification and revision system (300) is not limited to the detection of only these equipment items. The autonomous drawing verification and revision system (300) is readily applied to identify and detect, with high technical detail, other equipment items such as vessels, pumps, compressors, valves, reducers, bleeds, and pipelines.

As stated, in one or more embodiments, the autonomous drawing verification and revision system (300) uses one or more machine-learned models. Machine learning, broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein, however, one skilled in the art will recognize that the concepts and methods detailed hereafter are not limited by this choice of nomenclature.

Machine-learned model types may include, but are not limited to, neural networks, random forests, generalized linear models, and Bayesian regression. Machine-learned model types are usually associated with additional "hyper-parameters" which further describe the model. For example, hyperparameters providing further detail about a neural network may include, but are not limited to, the number of layers in the neural network, choice of activation functions, inclusion of batch normalization layers, and regularization strength. The selection of hyperparameters surrounding a model is referred to as selecting the model "architecture." Generally, multiple model types and associated hyperparameters are tested and the model type and hyperparameters that yield the greatest predictive performance on a hold-out set of data is selected.

As noted, possible objectives of the machine-learned models used by the autonomous drawing verification and revision system (300) may include detecting and identifying objects in visual images, image segmentation tasks, generating a field representation of a facility, and identifying differences or discrepancies between a facility and the drawings on file that represent the facility. Machine-learned models may act in coordination or independently. In one or more embodiments the results of multiple machine-learned models are used in an ensemble to form a prediction for a target quantity. In accordance with one or more embodiments, one or more machine-learned model types and associated architectures are selected and trained to perform specific tasks such as object detection and discrepancy identification.

Figure 5:
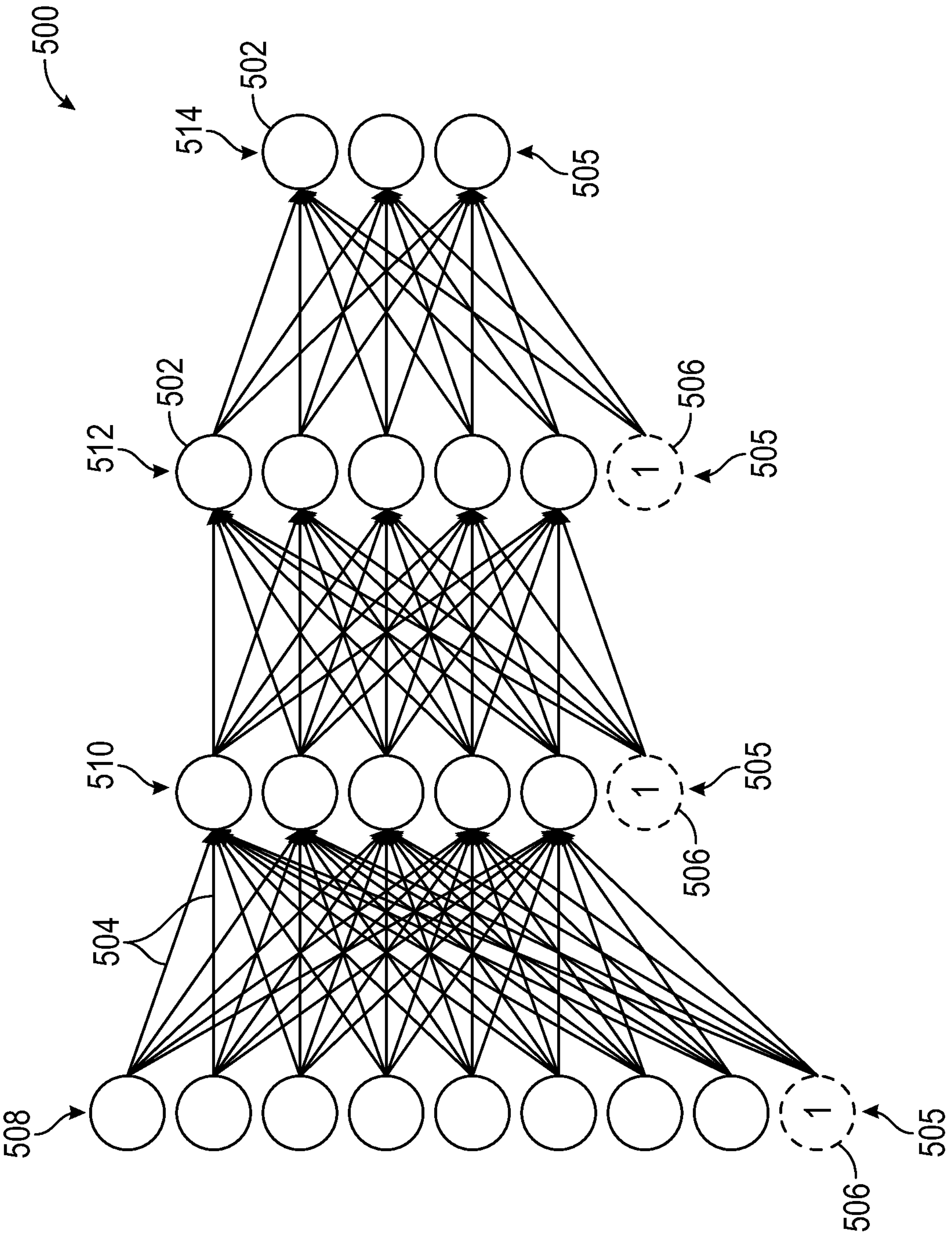
FIG. 5 depicts a neural network in accordance with one or more embodiments.

As an example of a machine-learned model that may be included in the autonomous drawing verification and revision system (300), FIG. 5 depicts a diagram of a neural network (500). At a high level, a neural network (500) may be graphically depicted as being composed of nodes (502), where here any circle represents a node, and edges (504), shown here as directed lines. The nodes (502) may be grouped to form layers (505). FIG. 5 displays four layers (608, 610, 612, 614) of nodes (502) where the nodes (502) are grouped into columns, however, the grouping need not be as shown in FIG. 5. The edges (504) connect the nodes (502). Edges (504) may connect, or not connect, to any node(s) (502) regardless of which layer (505) the node(s) (502) is in. That is, the nodes (502) may be sparsely and residually connected. A neural network (500) will have at least two layers (505), where the first layer (508) is considered the "input layer" and the last layer (514) is the "output layer." Any intermediate layer (610, 612) is usually described as a "hidden layer." A neural network (500) may have zero or more hidden layers (610, 612) and a neural network (500) with at least one hidden layer (610, 612) may be described as a "deep" neural network or as a "deep learning method." In general, a neural network (500) may have more than one node (502) in the output layer (514). In this case the neural network (500) may be referred to as a "multi-target" or "multi-output" network.

Nodes (502) and edges (504) carry additional associations. Namely, every edge is associated with a numerical value. The edge numerical values, or even the edges (504) themselves, are often referred to as "weights" or "parameters." While training a neural network (500), numerical values are assigned to each edge (504). Additionally, every node (502) is associated with a numerical variable and an activation function. Activation functions are not limited to any functional class, but traditionally follow the form $$A = f\left(\sum_{i\in(incoming)}[(\text{node value})_i(\text{edge value})_i]\right),$$

where i is an index that spans the set of "incoming" nodes (502) and edges (504) and f is a user-defined function. Incoming nodes (502) are those that, when viewed as a graph (as in FIG. 5), have directed arrows that point to the node (502) where the numerical value is being computed. Some functions for $f$ may include the linear function $f(x)=x$, sigmoid function $$f(x) = \frac{1}{1+e^{-x}},$$

and rectified linear unit function $f(x)=\max(0,x)$, however, many additional functions are commonly employed. Every node (502) in a neural network (500) may have a different associated activation function. Often, as a shorthand, activation functions are described by the function $f$ by which it is composed. That is, an activation function composed of a linear function $f$ may simply be referred to as a linear activation function without undue ambiguity.

When the neural network (500) receives an input, the input is propagated through the network according to the activation functions and incoming node (502) values and edge (504) values to compute a value for each node (502). That is, the numerical value for each node (502) may change for each received input. Occasionally, nodes (502) are assigned fixed numerical values, such as the value of 1, that are not affected by the input or altered according to edge (504) values and activation functions. Fixed nodes (502) are often referred to as "biases" or "bias nodes" (506), displayed in FIG. 5 with a dashed circle.

In some implementations, the neural network (500) may contain specialized layers (505), such as a normalization layer, or additional connection procedures, like concatenation. One skilled in the art will appreciate that these alterations do not exceed the scope of this disclosure.

As noted, the training procedure for the neural network (500) comprises assigning values to the edges (504). To begin training the edges (504) are assigned initial values. These values may be assigned randomly, assigned according to a prescribed distribution, assigned manually, or by some other assignment mechanism. Once edge (504) values have been initialized, the neural network (500) may act as a function, such that it may receive inputs and produce an output. As such, at least one input is propagated through the neural network (500) to produce an output. Recall, that a given data set will be composed of inputs and associated target(s), where the target(s) represent the "ground truth," or the otherwise desired output. The neural network (500) output is compared to the associated input data target(s). The comparison of the neural network (500) output to the target(s) is typically performed by a so-called "loss function;" although other names for this comparison function such as "error function," "misfit function," and "cost function" are commonly employed. Many types of loss functions are available, such as the mean-squared-error function, however, the general characteristic of a loss function is that the loss function provides a numerical evaluation of the similarity between the neural network (500) output and the associated target(s). The loss function may also be constructed to impose additional constraints on the values assumed by the edges (504), for example, by adding a penalty term, which may be physics-based, or a regularization term. Generally, the goal of a training procedure is to alter the edge (504) values to promote similarity between the neural network (500) output and associated target(s) over the data set. Thus, the loss function is used to guide changes made to the edge (504) values, typically through a process called "backpropagation."

While a full review of the backpropagation process exceeds the scope of this disclosure, a brief summary is provided. Backpropagation consists of computing the gradient of the loss function over the edge (504) values. The gradient indicates the direction of change in the edge (504) values that results in the greatest change to the loss function. Because the gradient is local to the current edge (504) values, the edge (504) values are typically updated by a "step" in the direction indicated by the gradient. The step size is often referred to as the "learning rate" and need not remain fixed during the training process. Additionally, the step size and direction may be informed by previously seen edge (504) values or previously computed gradients. Such methods for determining the step direction are usually referred to as "momentum" based methods.

Once the edge (504) values have been updated, or altered from their initial values, through a backpropagation step, the neural network (500) will likely produce different outputs. Thus, the procedure of propagating at least one input through the neural network (500), comparing the neural network (500) output with the associated target(s) with a loss function, computing the gradient of the loss function with respect to the edge (504) values, and updating the edge (504) values with a step guided by the gradient, is repeated until a termination criterion is reached. Common termination criteria are: reaching a fixed number of edge (504) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (504) values are no longer intended to be altered, the neural network (500) is said to be "trained."

Another type of machine-learned model that may be employed by the gas leak detection and resolution system (200) (e.g., for object detection) is a convolutional neural network (CNN). A CNN is similar to a neural network (500) in that it can technically be graphically represented by a series of edges (504) and nodes (502) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. Images have such a structural relationship. Consequently. CNNs are particularly apt at processing images.

A structural grouping, or group, of weights is herein referred to as a "filter." The number of weights in a filter is typically much less than the number of inputs. In a CNN, the filters can be thought as "sliding" over, or convolving with, the inputs to form an intermediate output or intermediate representation of the inputs which still possesses a structural relationship. Like unto the neural network (500), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. Generally, the structural relationship of the final intermediate representations is ablated; a process known as "flattening." The flattened representation is usually passed to a neural network (500) to produce the final output. Note, that in this context, the neural network (500) is still considered part of the CNN. Like unto a neural network (500), a CNN is trained, after initialization of the filter weights, and the edge (504) values of the internal neural network (500), if present, with the backpropagation process in accordance with a loss function.

While a few types of machine-learned models have been briefly described, one with ordinary skill in the art will appreciate that the autonomous drawing verification and revision system (300) is not limited to only using the listed machine-learned models. Machine-learned models such as a random forest, visual transformers (ViTs), or non-parametric methods such as K-nearest neighbors or a Gaussian process may be readily inserted into this framework and do not depart from the scope of this disclosure.

In accordance with one or more embodiments, one or more of the machine-learned models (330) used by the autonomous drawing verification and revision system (300) may be trained to perform a specific task. Training of the one or more machine-learned models (330) is facilitated using modeling data that includes examples of AV data (316), associated drawings (304), and updated drawings (306) and/or identified discrepancies (e.g., differences are made apparent with a marked-up drawing). In accordance with one or more embodiments, the modeling data is stored in a historical database (390) accessible by the autonomous drawing verification and revision system (300). In one or more embodiments, the modeling data may be partitioned into various sets of data such as a training set, validation set, and test set. In one or more embodiments, the modeling data is preprocessed before use to train the one or more machine-learned models (330). Preprocessing may include normalization and imputation. Further, in one or more embodiments, modeling data may be augmented by perturbing example instances in the modeling data. For example, data augmentation may include the application of random affine operations of images of a facility. In accordance with one or more embodiments, the modeling data (or a partition of the modeling data) is used to train the one or more machine-learned models. Training may include the tuning and/or intelligent selection of model hyperparmeters scored according to a validation set of the modeling data and an estimation of the generalization error of the machine-learned models. Once trained, one or more machine-learned models (330) may be "deployed" for use in the autonomous drawing verification and revision system (300). As such, the autonomous drawing verification and revision system (300) may obtain or receive drawings (304) and AV Data (316) not present in the modeling data and produce updated drawings (306).

Figure 6:
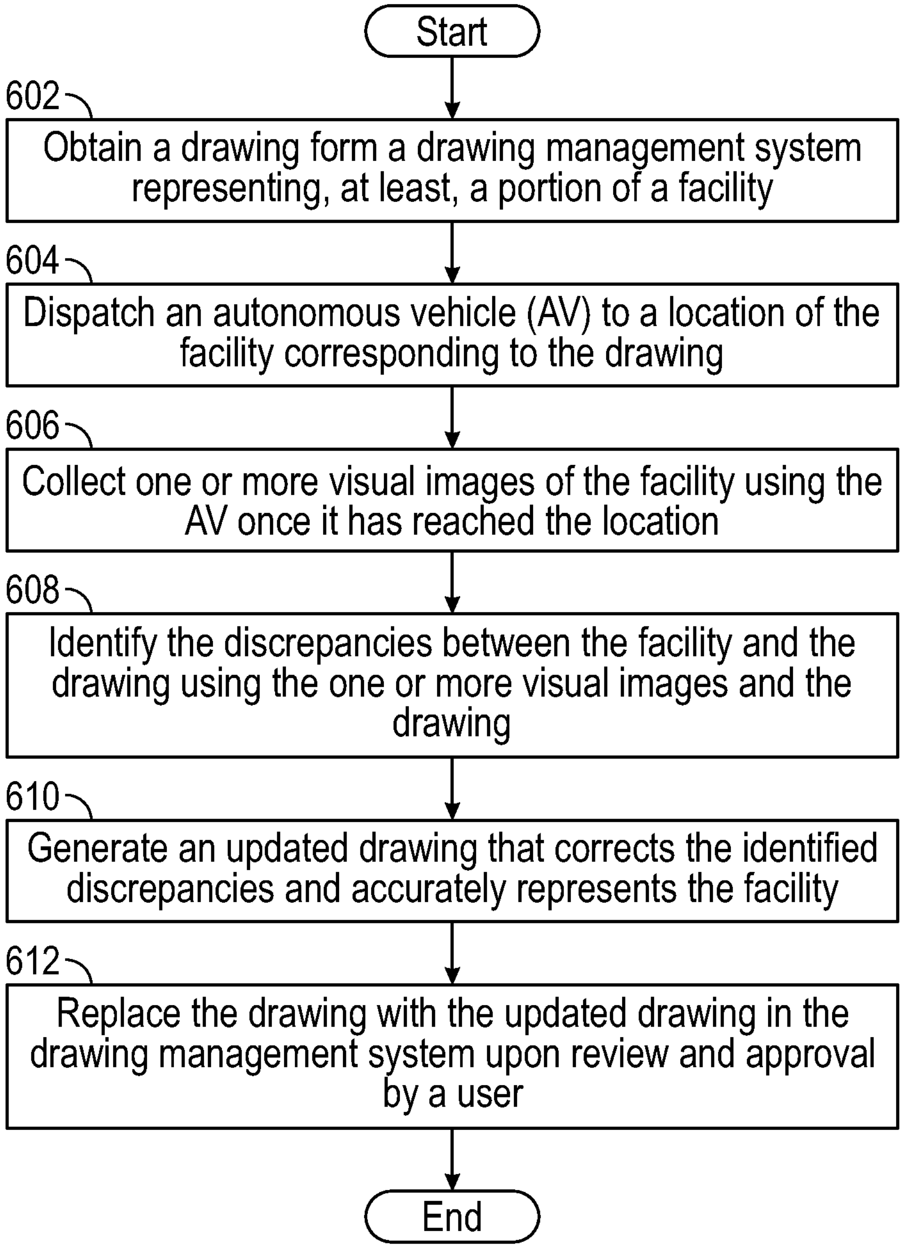
FIG. 6 depicts a flow chart, in accordance with one or more embodiments.

FIG. 6 depicts a flowchart outlining the use of the autonomous drawing verification and revision system (300), as described herein, in accordance with one or more embodiments. It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

In Block 602, a drawing is obtained from a drawing management system or other drawings archive or database. The drawing represents a facility, or at least a portion of a facility. The facility may be a processing plant such as the gas processing plant depicted in FIG. 1. In one or more embodiments, the drawing is a piping and instrumentation diagram (P&ID). In Block 604, an autonomous vehicle (AV) is dispatched to a location of the facility. The location corresponds to the area of the facility represented by the drawing. In one or more embodiments, the AV is navigated without human intervention. In one or more embodiments, the AV is dispatched according to a dispatcher. In one or more embodiments, the dispatcher dispatches the AV based on a pre-determined frequency or schedule. In Block 606, the AV is used to collect one or more visual images of the facility upon arriving at the location. In one or more embodiments, the one or more visual images are processed to form a field representation of the facility, or the portion of facility imaged by the AV. In one or more embodiments, the field representation is a 3D isometric representation of the facility. In other embodiments, the field representation is of the same format as the drawing (e.g., a P&ID). In Block 608, discrepancies, if any, are identified between the drawing and the facility using the drawing and the one or more visual images. In one or more embodiments, the discrepancies are identified by comparing the drawing to the field representation. In one or more embodiments, the technical specifications, locations, and directed connectivity of equipment items of the facility are determined and compared to the drawing. In one or more embodiments, discrepancies are identified using one or more machine-learning models. In Block 610, an updated drawing is generated. The updated drawing corrects the identified discrepancies such that the updated drawing accurately represents the facility according to the one or more visual images and/or field representation. In one or more embodiments, the updated drawing is a "marked-up" version of the drawing wherein the desired alterations to the drawing are overlaid on the drawing. In one or more embodiments, the updated drawing is a so-called "clean" version of the drawing wherein any markups to the drawing have been applied. In Block 612, the updated drawing is reviewed by a user (e.g., a member of a CADD group). The updated drawing may be reviewed in view of the original drawing and the one or more visual images and/or field representation. If the updated drawing is approved by the user, the original drawing is replaced with the updated drawing in the drawing management system. If the drawing is not approved, an updated drawing may be manually produced by the user in view of the original drawing and the one or more visual images and subsequently uploaded to the drawing management system. In one or more embodiments, rather than update the drawing to reflect the facility, the facility may be modified according to the drawing. That is, in or more embodiments, the user may determine that the drawing is proper and that a corrective action should be applied to the facility. Corrective actions may include, but are not limited to, installing and/or removing one or more equipment items.

Figure 7:
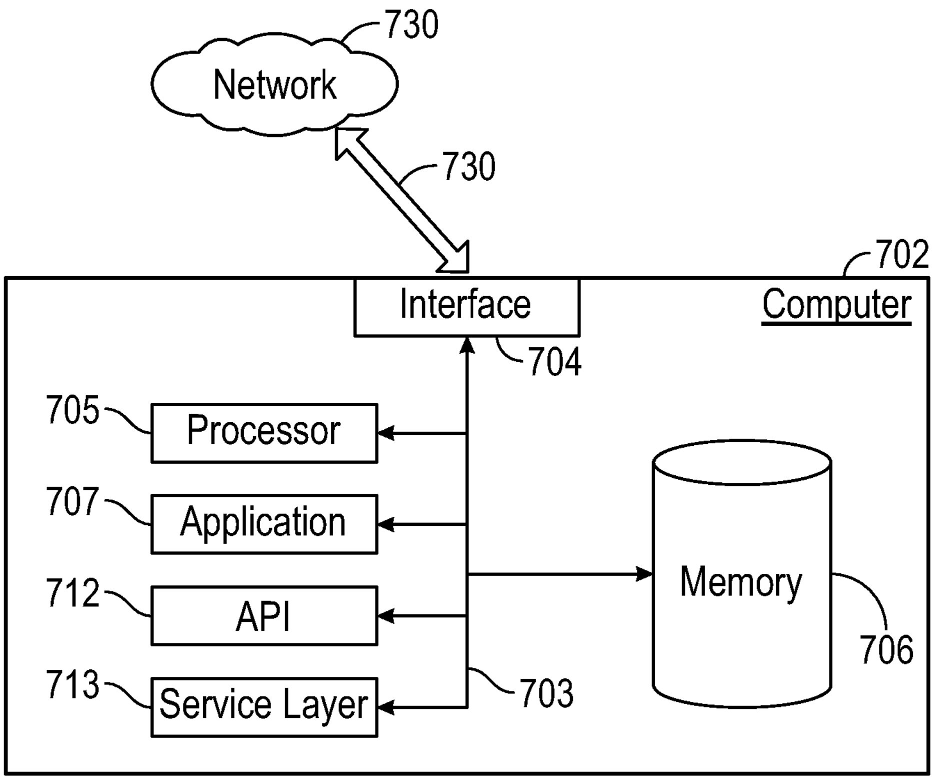
FIG. 7 depicts a system in accordance with one or more embodiments.

FIG. 7 depicts a block diagram of a computer system (700) used to provide computational functionalities associated with the methods, functions, processes, flows, and procedures as described in this disclosure, according to one or more embodiments. One or more computers, such as that depicted in FIG. 7, may be used by, interfaced with, or included in the autonomous drawing verification and revision system (300) described herein. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702) and responding to the received requests by processing the said requests in an appropriate software application). In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713)). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). The memory may be a non-transitory computer readable medium. For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. Although multiple dependent claims are not introduced, it would be apparent to one of ordinary skill that the subject matter of the dependent claims of one or more embodiments may be combined with other dependent claims.

What is claimed is:

1. A method, comprising:

obtaining an engineering drawing from a drawing management system representing, at least, a portion of a processing plant, wherein a modified equipment item is disposed in the processing plant;

dispatching an autonomous vehicle (AV) to a location of the processing plant corresponding to the engineering drawing;

collecting a visual image of the modified equipment item disposed in the processing plant using the AV once it has reached the location;

identifying discrepancies in the engineering drawing by comparing the engineering drawing and the visual image;

generating an updated engineering drawing that corrects the identified discrepancies in the engineering drawing and accurately represents the modified equipment item disposed in the processing plant according to the visual image; and replacing the engineering drawing with the updated engineering drawing in the drawing management system upon review and approval by a user.

2. The method of claim 1, further comprising generating an inventory of the modified equipment item based on the visual image.

3. The method of claim 1, further comprising identifying the modified equipment item as requiring a maintenance action based on the visual image.

4. The method of claim 3, further comprising applying the maintenance action to the identified modified equipment item.

5. The method of claim 1, further comprising physically modifying the modified equipment item to make the processing plant and the engineering drawing congruent.

6. The method of claim 1, wherein the AV is dispatched to the location automatically and navigated without human interaction.

7. The method of claim 1, wherein the discrepancies in the engineering drawing are identified using one or more machine-learned models.

8. The method of claim 7, wherein at least one of the one or more machine-learned models is a convolutional neural network.

9. The method of claim 1, further comprising generating a field representation of the processing plant from the visual image.

10. The method of claim 1, wherein the AV is a drone.

11. A system, comprising:

a drawing management system storing an engineering drawing representing, at least, a portion of a processing plant, wherein a modified equipment item is disposed in the processing plant;

an autonomous vehicle system (AVS) configured to dispatch an autonomous vehicle (AV) to a desired location, wherein the AV is navigated without human interaction and is configured to acquire a visual image of the modified equipment item disposed in the processing plant upon arriving at the desired location; and a computer communicably connected to the AVS, comprising:

one or more computer processors, and a non-transitory computer readable medium storing instructions executable by a computer processor, the instructions comprising functionality for:

obtaining the engineering drawing from the drawing management system;

transmitting a signal to the AVS to dispatch the AV to the desired location corresponding the engineering drawing;

receiving the visual image;

identifying discrepancies in the engineering drawing by comparing the engineering drawing and the visual image;

generating an updated engineering drawing that corrects the identified discrepancies in the engineering drawing and accurately represents the modified equipment item disposed in the processing plant according to the visual image; and replacing the engineering drawing with the updated engineering drawing in the drawing management system upon review and approval by a user.

12. The system of claim 11, wherein the instructions further comprise functionality for generating an inventory of the modified equipment items based on the visual image.

13. The system of claim 11, wherein the instructions further comprise functionality for further comprising physically modifying the modified equipment item to make the processing plant and the engineering drawing congruent.

14. The system of claim 11, wherein the discrepancies in the engineering drawing are identified using one or more machine-learned models.

15. The system of claim 14, wherein at least one of the one or more machine-learned models is a convolutional neural network.

16. The system of claim 14, wherein the AV is a drone.

17. The system of claim 11, wherein the instructions further comprise functionality further comprising generating a field representation of the processing plant from the visual image.

18. A non-transitory computer-readable memory comprising computer-executable instructions stored thereon that, when executed on a processor, cause the processor to perform steps comprising:

obtaining an engineering drawing from a drawing management system representing, at least, a portion of a processing plant, wherein a modified equipment item is disposed in the processing plant;

dispatching an autonomous vehicle (AV) to a location of the processing plant corresponding to the engineering drawing;

collecting a visual image of the modified equipment item disposed in the processing plant using the AV once it has reached the location;

identifying discrepancies in the engineering drawing by comparing the engineering drawing and the visual image;

generating an updated engineering drawing that corrects the identified discrepancies in the engineering drawing and accurately represents the modified equipment item disposed in the processing plant according to the visual image; and replacing the engineering drawing with the updated engineering drawing in the drawing management system upon review and approval by a user.

19. The non-transitory computer-readable memory of claim 18, wherein the discrepancies in the engineering drawing are identified using one or more machine-learned models.

20. The non-transitory computer-readable memory of claim 18, wherein the steps further comprise generating an inventory of the modified equipment item based on the visual image.

* * * * *